United States Patent [19]

Sting

[11] Patent Number: 4,810,077

[45] Date of Patent: Mar. 7, 1989

[54] GRAZING ANGLE MICROSCOPE

[75] Inventor: Donald W. Sting, New Canaan, Conn.

[73] Assignee: Spectra-Tech, Inc., Stamford, Conn.

[21] Appl. No.: 829,085

[22] Filed: Feb. 13, 1986

[51] Int. Cl.$^4$ .................................................. G02B 21/06
[52] U.S. Cl. ..................................... 350/523; 350/525; 350/620
[58] Field of Search ................... 350/504–505, 350/523–528, 620; 356/371, 445–448

[56] References Cited

U.S. PATENT DOCUMENTS

| | | | |
|---|---|---|---|
| 1,016,369 | 2/1912 | Siedentopf | 350/525 |
| 1,613,583 | 1/1927 | Berek | 350/525 |
| 2,097,494 | 11/1937 | Lihotzky | 350/525 |
| 2,198,014 | 4/1940 | Ott | 350/505 |
| 3,055,259 | 9/1962 | Dietrich | 350/505 |
| 3,602,596 | 8/1971 | Astheimer | 356/51 |
| 3,718,396 | 2/1973 | Hennings | 356/399 |
| 3,719,421 | 3/1973 | Poilleux | 356/371 |
| 3,827,059 | 7/1974 | Rambauske | 350/620 |
| 3,843,227 | 10/1974 | Kato et al. | 350/527 |
| 4,358,202 | 11/1982 | Puffer et al. | 356/445 |
| 4,477,185 | 10/1984 | Berger et al. | 356/152 |
| 4,479,700 | 10/1984 | Abe | 350/523 |
| 4,558,949 | 12/1985 | Uehara et al. | 356/152 |
| 4,594,509 | 6/1986 | Simon et al. | 250/338 |
| 4,653,880 | 3/1987 | Sting et al. | 350/620 |
| 4,655,592 | 4/1987 | Allemand | 350/620 |
| 4,657,360 | 4/1987 | Izukawa et al. | 350/620 |

FOREIGN PATENT DOCUMENTS

| | | | |
|---|---|---|---|
| 0144869 | of 0000 | European Pat. Off. | |
| 2333181 | 1/1974 | Fed. Rep. of Germany | 350/620 |
| 2173436 | 10/1973 | France | 350/527 |
| 983455 | 12/1982 | U.S.S.R. | 356/371 |

OTHER PUBLICATIONS

Syassen et al, "Microoptic Double Beam System for Reflectance and Absorption Measurements at High Pressure", Rev. of Sci. Instruments, 5-1982, pp. 644-650.

Gupta, D. C., "Non–Destructive Determination of Carrier Concentration in Epitaxial Silicon Using a Total Internal Reflection Technique", Solid State Electronics, vol. 13, #5, 1970, pp. 543-552.

Burch, C. R., "Reflecting Microscopes", Proc. Physical Soc. (London), vol. 59, 1947, pp. 541-549.

Hartmann, H. S., "High-Temperature Microscopy", Glass Industry, 3-1970, pp. 116-117.

BIO-RAD, Digilab Division, The New Digilab Micro/IR40 Spectrometer.

Digilab Micro/FT-IR Users Newsletter, vol. 2, No. 1, Jan. 1986.

Primary Examiner—John K. Corbin
Assistant Examiner—Martin Lerner
Attorney, Agent, or Firm—Calfee, Halter & Griswold

[57] ABSTRACT

A grazing angle microscope includes a highly convex central spherical mirror segment and a highly concave annular spherical mirror segment. A beam of incident radiant energy is sequentially directed against a part of the first convex mirror and a first part of the concave mirror onto a surface area at grazing angles so as to form a focused image on the surface area. A second part of the concave mirror collects radiant energy reflected from the surface at grazing angles and directs it to a second part of the convex mirror for reflection to a detector. Masking means are located at a focus that is remote from the surface area to determine the geometric shape of the image of the remote focus to target the surface area to be sampled by radiant energy. The masking means is adjusted during viewing in a visible light mode, with the visible light having a common optical path and common focal points with the radiant energy. The grazing angle microscope may obtain meaningful magnifications of a surface area as great as a 150 times for grazing angles between 60° and 85° off a normal to the surface area.

16 Claims, 2 Drawing Sheets

GRAZING ANGLE MICROSCOPE

BACKGROUND OF THE INVENTION

1. Field of the Invention

This invention relates to an optical system for a microscope that can direct radiant energy to and receive radiant energy from a surface at grazing angles.

2. Description of related Art

Many industrial and scientific applications, particularly spectroscopic applications, require illuminating a surface by focusing a beam of radiant energy onto the surface at grazing angles of incidence. The term grazing angles, also referred to as glancing angles, corresponds to angles between 60° and 90° as measured from a line that is normal to the surface. Many applications also require observing energy reflected from the surface at grazing angles of reflection, and often a surface must be simultaneously illuminated and observed at grazing angles.

One method for observing a surface grazing angle of incidence and reflection is to geometrically align a beam of incident energy and a detector with the surface so that the energy is incident to the surface at grazing angles of incidence and reflects from the surface to the detector at grazing angles of reflection. Geometrically positioning a source, receiver and surface, however, is cumbersome and often totally impractical.

Another method for obtaining grazing angles of incidence and reflection in an optical system having a practical size involves using a multiple mirror configuration to curve an incident beam of energy to a surface at grazing angles by sequentially reflecting the beam of energy with a series of mirrors at a high angle of incidence relative to each mirror. The multiple mirror configuration, however, cannot form a sharp image on the surface because a part of the beam of energy that travels to the surface from a remote point must start nearer to the mirrors and travel a greater distance to reach the surface. The resulting difference in effective focal lengths for different areas of the beam of energy necessarily increases the minimum area needed to form a focus on the surface at grazing angles and, therefore, distorts the image at the surface. A microscope that uses a multiple mirror configuration cannot obtain high magnifications because of the poor image quality resulting from the poor focus on the surface.

U.S. Pat. No. 2,198,014 discloses a magnifying apparatus comprising a small convex reflector imbedded within a concave mirror. The mirror arrangement may form an image of a sample that is illuminated with energy transmitted through the sample at an angle relative to a normal to the sample. The magnifying apparatus appears to collect light over a large field of view from a small area on the sample or to collect light from a large area on the surface with poor image quality.

It is known that a surface may be microscopically observed with a technique known as dark field illumination. This technique involves illuminating a sample with light having an angle of incidence in one range and observing the light at an angle of reflection in a different range so that light that is specularly reflected from the surface of the sample is never directly observed. Thus, the field of view is always "dark" except for light that is diffusely reflected by the sample into the field of view. Dark field illumination therefore does not contemplate simultaneously illuminating a surface at grazing angles of incidence and observing specularly reflected light.

SUMMARY OF THE INVENTION

The present invention relates to a method and compact optical system for illuminating a surface at grazing angles of incidence and observing the surface at grazing angles of reflection. The present invention also obtains a high magnification of the surface at grazing angles by producing a high quality image on the surface. Moreover, the present invention provides for shaping the image into an arbitrary geometric shape on the surface so as to select the area of the surface actually observed.

The invention includes a grazing angle microscope objective to focus the radiant energy on the surface at grazing angles. The objective comprises a small, highly convex central mirror positioned along an optical axis with a larger, highly concave mirror. A beam of radiant energy travels between a first point and the central convex mirror along a first portion of the optical path. The radiant energy is reflected between the convex central mirror and the concave annular mirror along a second portion of the optical path. The concave mirror reflects the beam of radiant energy to a locus plane, preferably corresponding to the surface of a sample, along a third portion of the optical path at grazing angles corresponding to 60° through 90° off a normal to the locus plane. The beam of radiant energy is preferably brought to a focus at the locus plane to form an image. A detector measures the radiant energy reflected from the surface at grazing angles.

The grazing angle microscope objective may further comprise a second concave mirror to collect energy reflected from the surface at grazing angles of reflection along a fourth portion of the optical path. A second convex mirror receives reflected energy from the second concave mirror along a fifth portion of the optical path and reflects the energy to a detector along a sixth portion of the optical path.

The present invention provides for masking the observation area on the surface of a sample so as to select the area on the surface seen by the detector. Either the incident energy or the reflected energy is focused at a remote focus at a location that is remote from the surface. A mask comprising, for example, four knife edges are positioned at the remote focus to block out energy from undesired areas of the surface. Preferably, a second optical path is coincident with the first optical path at the shutter to permit the surface to be illuminated, observed and masked with a second beam of radiant energy.

The preferred embodiment further comprises first and second intercepting mirrors having a half ring annular shape and a flat mirrored surfaces that are formed from equal halves of an annular ring segment of a flat mirror. The first and second convex mirrors are integrally formed to share a common mirrored surface so as to form a small central mirror. Likewise, the first and second concave mirrors are integrally formed to share a common mirrored surface so as to form a concave annular mirror about the central mirror. The first intercepting mirror reflects incident radiant energy to the first convex mirror along said first portion of the optical path. The radiant energy traverses the first, second, third, fourth, fifth and sixth portions of the optical path, respectively, to the second intercepting mirror. A detector receives the reflected radiant energy along the optical path from the second intercepting mirror.

The grazing angle microscope of the present invention has obtained a high quality image of a sample surface at grazing angles from 60° to 85° at a magnification factor of 150 times. The present invention may be used at grazing angles of 90°.

DESCRIPTION OF THE PREFERRED EMBODIMENTS

Figure 1:
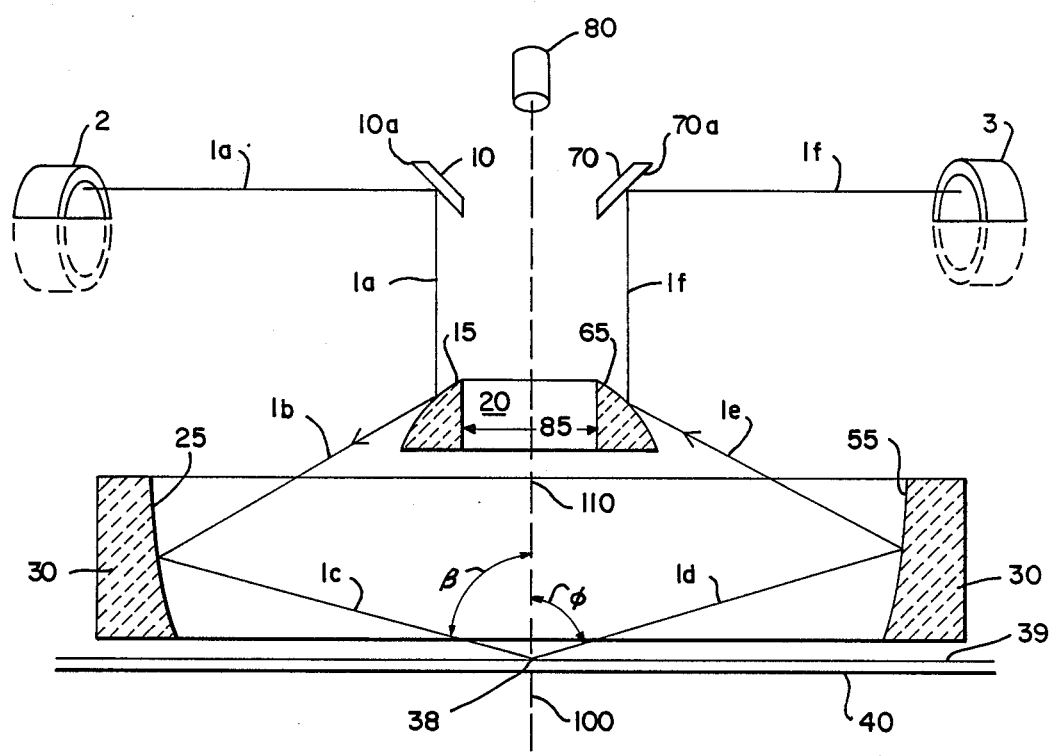
FIG. 1 schematically illustrates an optical configuration for the preferred embodiment of the grazing angle microscope objective of the present invention.

Referring to FIG. 1, a beam of radiant energy 1a from emitter 2 traces an optical path by first reflecting from a flat mirrored surface 10a of a first intercepting mirror 10. A first convex mirror 15 of central mirror 20 reflects energy from intercepting mirror 10 to a first concave mirror 25 of annular mirror 30 along a first portion 1a of the optical path. The first convex mirror 15 is sufficiently convex that the energy reflected from first convex mirror 15 diverges along a second portion 1b of the optical path between first convex mirror 15 and first concave mirror 25. First concave mirror 25 is sufficiently concave to focus the beam of radiant energy from central mirror 20 to form an image about a surface point 38 on the locus plane 39 corresponding to a primary focus on the surface of a sample 40 along a third portion 1c of the optical path. Mirrors 15 and 25 have spherical curvatures effectively centered about a common center of curvature 110. No point on mirror 15 shares a radii in common with mirror 25.

A second concave mirror 55 collects radiant energy reflected from locus plane 39 of surface 40 along a fourth portion 1d of the optical path. Second concave mirror 55 is preferably formed integral with first concave mirror 25 so as to form a common mirrored surface on annular mirror 30. Radiant energy is directed from second concave mirror 55 to second convex mirror 65 over a fifth portion 1e of the optical path. Second convex mirror 65 is preferably formed integral with first convex mirror 15 so as to form a common mirrored surface on central mirror 20. Mirrors 55 and 65 have spherical curvature effectively centered about a common center of curvature 110 and are positioned so that no point on mirror 65 shares a common radii with mirror 55. Second convex mirror 65 is sufficiently convex to cause the reflected energy to converge along a sixth portion 1f of the optical path. Second intercepting mirror 70 comprises a flat mirror 70a that reflects the converging beam of reflected energy 1f from second convex mirror 65 to detector 3 to complete the optical path.

It is considered significant that the annular concave mirror 30 extends behind the two mirrored surfaces of central convex mirror 20 to permit energy to reflect to and from the locus plane 39 of sample 40 at grazing angles. The mirrored surfaces 25 and 55 of mirror 30 extend closer to the locus plane for larger grazing angles and touch the locus plane for a grazing angle of 90°. At large grazing angles, however, the surface may vignette the image if the optical path followed by the beam of energy is too close to the surface. Further, irregularities on the surface along the optical path vignette the image of the source at grazing angles approaching 90° and thus establish a practical limit to the maximum grazing angle.

In the preferred embodiment, the mirrored surfaces on the concave and convex mirrors are effectively concentric about a common center of curvature. A common center of curvature ensures, ideally, that the image will be free of spherical aberration which is normally the primary distortion in an optical system using spherical optics. Thus, the phrase "effectively concentric about the center of curvature" means that the mirrored surfaces are concentric to an approximation corresponding to the relative importance of spherical aberration to a particular design. However, lower order distortions such as coma may become significant for a particular optical design and necessitate slightly offsetting the mirrors from a common center of curvature or departing altogether from concentric optics. Any resulting spherical aberration may, however, be reduced in other ways as discussed below.

As shown in FIG. 1, intercepting mirrors 10 and 70 reflect radiant energy between only an outer ring-shaped region of central mirror 20 to minimize any distortions in image quality caused by imperfections in the spherical mirrors. The unused portions of the beam of radiant energy are absorbed by an energy stop, not shown. It is to be appreciated that the quality of the image may be degraded if an intercepting mirror is located near any focus in the optical path because the extent to which the intercepting mirror vignettes the image increases as the intercepting mirrors means a focus. Thus, both intercepting mirrors are preferably remote from the focus at the locus plane as well as any focus that is remote from the locus plane along the optical path. The effective distance of the intercepting mirrors from a focus might be increased by placing a concave mirrored surface at 10a and 70a. However, the improved image quality would be marginal and offset by the degradation in image quality resulting from aberrations introduced by more complex optical elements and by the additional expense involved in making and aligning concave intercepting mirrors. Therefore, each intercepting mirror preferably has a flat mirrored surface. It is to be appreciated, however, that either intercepting mirror could be replaced by a conventional beam splitter such as a partially silvered mirror.

Figure 2:
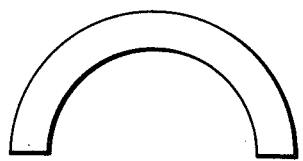
FIG. 2 represents a side profile of the intercepting mirrors shown in FIG. 1.

The shape of the first intercepting mirror 10 is particularly important for focusing the incident energy onto the locus plane 39 of sample 40. Fully one half of input beam 1a could be directed onto central mirror 20. As noted above, however, input beam 1a could not then focus onto locus plane 39 at grazing angles with the spherical mirrors 15 and 25 of the preferred embodiment. Even if concentric mirrored surfaces are not used, the present invention overcomes the need to produce expensive, small sized mirrors that have a complex curvature by using one half of a ring-shaped portion of a flat mirror to select an annular half segment of input beam 1a. Thus, the intercepting mirror 10 minimized optical distortion by directing only that portion of input beam 1a to locus plane 39 that spherical mirrors 15 and 25 may accurately focus. The half-ring shape of the intercepting mirrors as shown FIG. 2 is especially effective at reducing spherical aberration as produced, for example, by using nonconcentric mirrored surfaces on the central and an annular mirrors.

The unused portion of central mirror 20 may be bored out to provide a bore path for low magnification viewing of the locus plane 39 of sample 40 with eye piece 80. The optical system shown in FIG. 1 is aligned on an optical axis 100. Eye piece 80 is aligned with axis 100 to view locus plane 39 through aperture 85 in central mirror 20 so as to provide a means to view sample 40 under low magnification. Eye piece 80 is particularly useful for positioning the surface under low magnification and for approximately determining the area of the surface illuminated by energy beam 1.

It is to be appreciated that the present invention obtains a high quality image on locus plane 39. For example, the present invention can observe the surface of a sample with a useful magnification of 150 times at grazing angles between 60° and 85°. It is considered particularly significant for spectroscopic applications that the present invention can direct energy to, or receive energy from, the locus plane at grazing angles of greater than 70°.

The efficiency of the grazing angle microscope is normally maximized when the angle of incidence, $\beta$, equals the angle of reflection, $\phi$, because most surfaces exhibit specular reflection at grazing angles of incidence. In the preferred embodiment, the angles of incidence and reflection are controlled by the size of the intercepting mirrored surfaces 10a and 70a, respectively. A side profile of an intercepting mirror is shown in FIG. 2. It is to be appreciated, however, that the angles at which the energy is incident to the surface need not correspond to the angles at which reflected energy is detected.

The embodiment of the invention shown in FIG. 1 is preferred because the radiant energy is both directed to the surface at grazing angles, specularly reflected from the surface and collected from the surface at grazing angles. It is to be appreciated, however, that the optical system shown in FIG. 1 exhibits symmetry about optical axis 100 that is indicative of the reversibility of the optical path. For example, any energy emitted from locus plane 39 at grazing angles could be observed with mirrors 55 and 65 without mirrors 15 and 25 supplying illumination. Likewise, the surface could be illuminated by mirrors 15 and 25 and directly observed at grazing angles. The preferred embodiment permits the locus plane 39 of sample 40 to be simultaneously illuminated and observed with only one set of mirrors 15, 25 or 55, 65 by observing energy that is back-reflected at grazing angles along the optical path of the incident radiant energy. Similarly, the convergence or divergence of the radiant energy along the optical path may be changed to adapt the optical system to particular applications.

Figure 3:
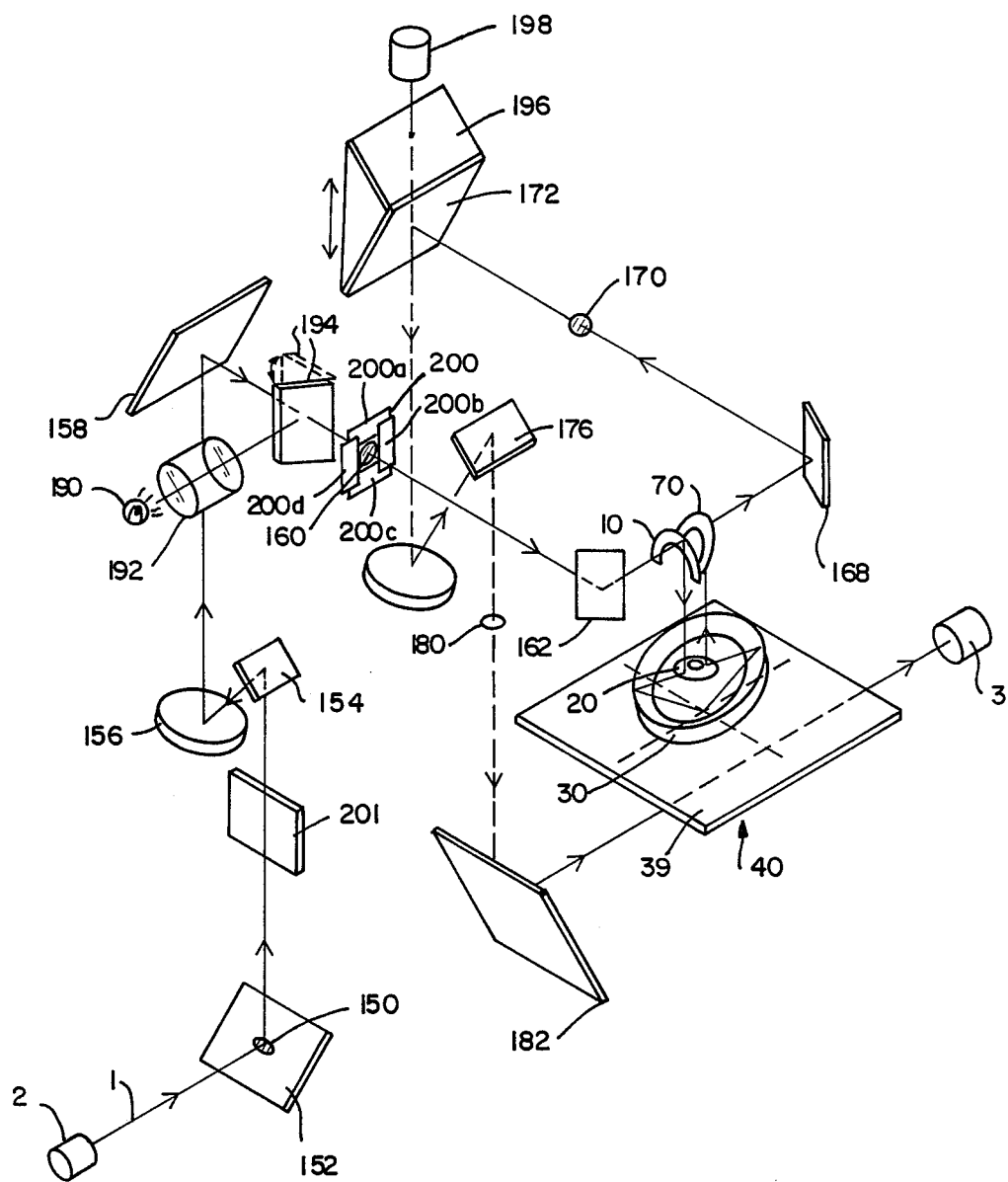
FIG. 3 schematically illustrates an embodiment of the present invention that allows for masking and visually inspecting and masking the image formed on a surface.

FIG. 3 shows the present invention used in conjunction with a "side focus" spectrophotometer such as a Model 1800 spectrophotometer manufactured by the Perkin Elmer Corporation. Emitter 2 and detector 3 are the emitter and detector of the spectrophotometer. Mirror 152 is located at the side of the chamber at an initial focus 150 of input energy beam 1. Plane mirrors 154, 158 and converging mirror 156 are positioned to focus the incident beam of energy at remote focus 160. Plane mirror 162 reflects the diverging beam of energy from remote focus 160 to intercepting mirror 10. The intercepting mirror 10 directs the incident beam of energy onto mirror 20 as a diverging beam.

Mirror 168 reflects a converging beam of reflected energy from mirror 20 and intercepting mirror 70 to a remote focus at focus 170. Mirror 172 reflects the diverging beam from remote focus 170 to a concave mirror 174. The convergence of mirror 174 is such that, in combination with flat mirror 176, the diverging energy beam from remote focus 170 is again focused at remote focus 180. Remote focus 180 is equidistant with focus 150 from mirror 182 so that detector 3 receives an undistorted image of the surface.

It is to be appreciated that the optical configuration shown in FIG. 3 is particularly advantageous for spectroscopy. For example, the grazing angle microscope objective formed by mirrors 20 and 30 may be positioned at an arbitrary distance from mirrors 152 and 182 so as to provide easier access to the surface.

The surface of sample 40 may be separately illuminated with visible radiant energy. One method of illuminating the surface is to exploit the path reversibility of the present invention by observing only radiant energy that is back-reflected at grazing angles. A beam splitter is inserted into the optical path so that visible radiant energy reaches the surface. A part of the radiant energy that is back reflected from the surface passes through the beam splitter and may be observed. Observing only radiant energy that is back-reflected at grazing angles makes visible only irregularities in the surface that do not specularly reflect the radiant energy that is incident to the locus plane. Such surface irregularities are often the surface features of primary interest.

For most applications, however, the amount of radiant energy that is back-reflected is too small and the resulting image too dim for accurately positioning the sample. Thus, the preferred embodiment of the invention visually observes visible radiant energy that is specularly reflected from the surface. Referring to FIG. 3, illumination source 190 is focused by lens 192 onto a partially silvered mirror 194 that may be moved into the first portion of the optical path. The incident radiant energy normally found on the first portion of the optical path is blocked by a shutter 201. Lens 192 preferably converges the visible radiant energy to correspond to the convergence of the incident radiation at position along the first portion of the optical path occupied by mirror 194. Mirror 194 reflects the visible radiant energy to mirrors 162 and 10. Radiant energy that is specularly reflected from the locus plane at grazing angles reflects to eye piece 198 from intercepting mirror 70 by way of flat mirror 196. Thus, the image formed on the surface may be visually inspected at a high magnification.

The present invention permits removing a part of the beam of energy received by detector 3 so as to shape the image formed at locus plane 39 into an arbitrary geometric shape. Referring to FIG. 3, concave mirror 156 focus the incident beam of energy at remote focus 160. A masking shutter 200 comprises four knife edges 200a–200d that form an aperture at remote focus 160. The geometric shape of the image formed at locus plane 39 corresponds to the image at remote focus 160 because mirrors 20 and 30 refocus the image from the remote focus onto the locus plane.

It is to be appreciated that intercepting mirror 10 is particularly significant to the present invention. FIG. 3 illustrates the use of a reflective beam splitting objective in masking the image at remote focus 160 and focusing the remote image at the locus plane 39. A portion of the beam of incident energy from remote focus 160 that corresponds to the half annular ring-shaped reflective surface of intercepting mirror 10 is directed toward locus plane 30. The presence of mirror 10 in the optical path does not vignette or otherwise reduce the image formed at locus plane 39 so long as the intercepting mirror is remote from either remote focus 160 or primary focus 38 as discussed above. Thus, the beam of radiant energy reaching mirror 20 comprises an undistorted image of the image formed at remote focus 160. Mirrors 20 and 30, in combination with mirror 10, act as a reflective beam splitting objective to refocus the image at remote focus 160 onto locus plane 39. The reflective beam splitting objective shown in FIG. 1 differs from the conventional reflective beam splitting objective, however, in that the reflective surface of concave mirror 30 used to reflect the radiant energy lies below convex mirror 20.

Mask 200 permits observing only that portion of the surface that has a particular microscopic shape as may be required in, for example, high magnification spectrophotometry of microfiberous materials. In addition, the mask could assume any geometric shape, such as a circular shape as formed by a circular diaphragm. It is to be appreciated that mask 200 could be positioned at any remote focus in the optical path, either before or after the surface, such as at remote focuses 150, 170 or 180. The considerations involved in masking the beam of energy at any other remote focus should be apparent from the foregoing discussion.

The grazing angle microscope shown in FIG. 3 operates as follows: sample 40 is first positioned at locus plane 39. An observation area on the surface of the sample is tentatively selected under low magnification with eye piece 80 as shown in FIG. 1. The precise observation area is then selected under high magnification with eye piece 198. Finally, the geometric shape of the observation area is determined with mask 200. Mirror 196 is slid out of the optical path, mirror 172 is slid into the optical path, and shutter 194 is removed from the optical path so that the source 2 and receiver 3 of the spectrophotometer have an unobstructed view of the surface of the sample. Indeed, it is preferred that the grazing angle microscope have no effect on the optical performance of the spectrophotometer. A grazing angle spectrum of the surface of the sample may then be obtained with the spectrophotometer.

The principles, preferred embodiments and modes of operation of the present invention have been described in the foregoing specification. The invention which is intended to be protected herein should not, however, be construed as limited to the particular forms described, as these are to be regarded as illustrative rather than restrictive. Variations and changes may be made by those skilled in the art without departing from the spirit of the present invention. Accordingly, the foregoing detailed description should be considered exemplary in nature and not as limiting to the scope and spirit of the invention set forth in the appended claims.

What is claimed is:

1. An optic system for analyzing samples comprising:
    a source of radiant energy;
    a source of visible light;
    a sample on a sample plane;
    means alternately to introduce the visible light in a viewing mode or the radiant energy in a sampling mode to a common optical path including the sample;
    means to direct the radiant energy or the visible light along the common optical path to intersect the sample at grazing angles and to form common focal points for both the radiant energy and visible light on the common optical path at the sample and at a remote image plane; and
    detector means to receive radiant energy reflected from the sample during the sampling mode to analyze characteristics of the sample.

2. The optic system of claim 1 further comprising viewing means to view along the common optical path in the viewing mode and a mask at the image plane, the mask being adjusted to an arbitrary shape defining a sample area on the sample, the arbitrary shape being selected by adjusting the mask while viewing the superimposed images of the sample and image plane during the viewing mode, with the radiant energy passing through the adjusted mask during the sampling mode on its way to the surface area.

3. The optic system of claim 2 wherein the means to direct is entirely reflective mirrors and includes a single Cassegranian type lens.

4. The optic system of claim 3 wherein the single Cassegranian type lens includes a central convex mirror and an outer concave mirror which is positioned entirely between the convex mirror and the sample plane, the concave mirror optically facing the convex mirror and the surface area to direct radiant energy or visible energy to the surface area at grazing angles of between 60° and 85° relative to an axis normal to the sample plane at the sample area.

5. The optic system of claim 1 wherein the detector is positioned to receive radiant energy generally specularly reflected from the sample area at grazing angles.

6. The optic system of claim 4 wherein the convex mirror is a truncated hemisphere and the concave mirror is annular, the convex and concave mirrors having radii of curvature concentric about a common center of curvature and being symmetrical about an optical axis normal to the locus plane at the sample area.

7. The optic system of claim 6 further comprising a first ring shaped interceptor mirror to divide and reflect incoming radiant energy onto a first limited ring shaped area of the convex mirror for sequential reflection to a first portion of the concave mirror and then to the surface area at grazing angles.

8. The optic system of claim 7 wherein specularly reflected outgoing radiant energy is collected by being sequentially reflected to a second portion of the concave mirror, to a second portion of the convex mirror, and then to a second ring shaped interceptor mirror for reflection to the detector.

9. The optic system of claim 6 wherein the truncated portion of the hemispherical convex mirror has a bore therethrough to provide a low magnification viewing path to the sample area along the optical axis of the system.

10. An optic system for analyzing samples comprising:
    a source of radiant energy;
    a source of visible light;
    a sample on a sample plane;
    means alternately to introduce the visible light in a viewing mode or the radiant energy in a sampling mode to a common optical path including the sample;
    means to direct the radiant energy or the visible light along the common optical path to intersect the sample and to form common focal points for both the radiant energy and visible light on the common optical path at the surface area and at a remote image plate;
    viewing means to view along the common optical path in the viewing mode;

masking means at a remote image plane, the masking means being adjusted in the viewing mode to an arbitrary shape selected to define a sample area on the sample by viewing the superimposed images of the sample and remote image plane being masked, the radiant energy in the sampling mode passing through the remote image plane as masked before impinging on the sample; and a detector means to receive radiant energy from the sample area during the sampling mode to analyze characteristics of the sample.

11. A method for forming an image of a microscopic area on a locus plane by directing either a beam of radiant energy in a sampling mode or visible light in a viewing mode along a common optical path, said common optical path extending between a radiant energy source or visible light source, the locus plane and a detector;

forming the image in either the sampling mode or viewing mode at a primary focus at the locus plane by directing the beam of radiant energy or visible light to the locus plane at grazing angles of incidence, said grazing angles lying between 60° and 90° relative to a line that is normal to the locus plane;

directing the beam of radiant energy from the primary focus to the detector along the common optical path at grazing angles of reflection lying between 60° and 90 relative to a line that is normal to the locus plane; and shaping the image formed on the locus plane into a predetermined geometric shape, said shaping step further comprising the steps of forming the image of at least one remote focus along the common optical path at a location that is remote from said locus plane and masking a part of the beam of energy from the optical path at said remote focus in the viewing mode, with the radiant energy in the sampling mode passing through the remote focus as masked on its way to the microscopic area on the locus plane.

12. A method for forming an image as claimed in claim 11, wherein said step of shaping is done before the beam of radiant energy reaches the locus plane so that the masking step removes said part of the beam of energy at said remote focus before the beam of energy reaches the locus plane.

13. A method for forming an image as claimed in claim 12, further comprising the step of intercepting a portion of the beam of radiant energy with an intercepting mirror before the locus plane and reflecting a portion of the beam of radiant energy to the locus plane, said step of intercepting being done at a position that is remote from any focus of the optical system so as not to vignette the image.

14. A method for forming an image as claimed in claim 13, wherein said intercepting is done after the beam of energy reaches the remote focus.

15. A method for forming an image as claimed in claim 14 including the further step of reflecting the radiant energy or visible light with a plurality of mirrors from the radiant energy source to the detector.

16. A method for forming an image as claimed in claim 15 including the further step of using one Cassegranian type lens to direct either the radiant energy or visible light beams to the primary focus at grazing angles.

* * * * *